United States Patent
Conner et al.

(10) Patent No.: US 12,303,942 B1
(45) Date of Patent: May 20, 2025

(54) SYSTEM AND METHOD FOR MIXED MATERIAL MAGNESIUM SORTING

(71) Applicant: Trinity Metals, LLC, Indianapolis, IN (US)

(72) Inventors: Wade T. Conner, Indianapolis, IN (US); Tyler Kruer, Indianapolis, IN (US)

(73) Assignee: Trinity Metals, LLC, Indianapolis, IN (US)

( * ) Notice: Subject to any disclaimer, the term of this patent is extended or adjusted under 35 U.S.C. 154(b) by 0 days.

(21) Appl. No.: 18/827,310

(22) Filed: Sep. 6, 2024

(51) Int. Cl.
*B07B 13/00* (2006.01)
*B07B 13/18* (2006.01)

(52) U.S. Cl.
CPC ............ *B07B 13/003* (2013.01); *B07B 13/18* (2013.01); *B07B 2220/00* (2013.01)

(58) Field of Classification Search
CPC ... B07B 13/003; B07B 13/18; B07B 2220/00; B07B 2230/01; B07B 5/10; B07B 5/342; B07B 5/3427; B07B 5/3416
USPC .......................................................... 209/3
See application file for complete search history.

(56) References Cited

U.S. PATENT DOCUMENTS

| | | |
|---|---|---|
| 5,676,256 A | 10/1997 | Kumar et al. |
| 6,068,133 A | 5/2000 | Schonfeld et al. |
| 6,100,487 A | 8/2000 | Schultz et al. |
| 7,367,457 B2 | 5/2008 | Warlitz et al. |
| 9,424,635 B2 | 8/2016 | Killman |
| 10,088,425 B2 | 10/2018 | Buckley et al. |
| 10,946,416 B2 | 3/2021 | Killman et al. |
| 2015/0225864 A1* | 8/2015 | Gesing .................. C04B 35/634 204/243.1 |
| 2017/0014868 A1* | 1/2017 | Garcia, Jr. ................. B07C 5/34 |
| 2018/0010210 A1* | 1/2018 | Tan ............................ B08B 3/14 |
| 2018/0010254 A1* | 1/2018 | Tan .......................... C22B 7/006 |
| 2019/0091729 A1* | 3/2019 | Gillner .................. B07C 5/3427 |

FOREIGN PATENT DOCUMENTS

| | | |
|---|---|---|
| CN | 106000913 A | 10/2016 |
| CN | 107737735 A | 2/2018 |
| DE | 3423866 C2 | 2/1987 |
| DE | 102022121928 A1 | 2/2024 |
| DE | 102022121929 A1 | 2/2024 |
| EP | 0389767 B1 | 1/1994 |
| JP | 5311376 B2 | 10/2013 |
| WO | 2001053547 A1 | 7/2001 |
| WO | 2002040171 A1 | 5/2002 |
| WO | 2014029493 A1 | 2/2014 |
| WO | 2018113228 A1 | 6/2018 |

* cited by examiner

*Primary Examiner* — Michael McCullough
*Assistant Examiner* — Jessica L Burkman
(74) *Attorney, Agent, or Firm* — Barnes & Thornburg

(57) ABSTRACT

A method of sorting a mix of scrap material to separate out magnesium scrap from the mixed scrap for reuse is presented herein. The method includes using sensors to detect characteristics of the scrap material and sorting or separating the scrap material into the different types based on the detected characteristics from the sensors.

19 Claims, 5 Drawing Sheets

SYSTEM AND METHOD FOR MIXED MATERIAL MAGNESIUM SORTING

FIELD OF THE DISCLOSURE

The present disclosure relates generally to scrap metal handling, and more specifically to sorting mixed metal scrap for reuse.

BACKGROUND

Magnesium offers unique material qualities and advantages that make it desirable for several manufacturing and industrial applications. Recycling magnesium scrap from various manufacturing processes or post-consumer use helps reduce costs and the amount of waste sent to landfills.

Different magnesium manufacturing processes, such as casting, machining, cutting, etc. produce magnesium scrap that may be recycled or re-melted for reuse. However, post-consumer magnesium scrap may be mixed in with other scrap material such that the magnesium scrap needs to be separated before it can be reused.

Separating the different metals within a mix of scrap material may be difficult, especially for magnesium scrap. Handpicking may be used to sort the magnesium scrap material, but can be time consuming and expensive. Therefore, more efficient sorting processes are needed to effectively and efficiently sort the magnesium scrap for reuse.

SUMMARY

The present disclosure teaches a method or process of sorting mix metal scrap to separate out magnesium scrap from the mixed metal scrap for reuse. The method comprises providing a mix of scrap material consisting essentially of aluminum and magnesium scrap, wetting the mix of scrap material with water to cause the magnesium scrap to turn blue in color, using a first set of sensors to detect a color and a density of each piece of scrap in the mix of scrap material after wetting the mix of scrap material with water, and removing any piece of scrap from the mix of scrap material if the detected parameters associated with each piece of metal scrap does not meet a first criteria set to provide rough-sorted magnesium scrap.

In some embodiments, while the rough-sorted magnesium scrap remains wet, the method further comprises using a second set of sensors to detect the color and the density of each piece of scrap in the rough-sorted magnesium scrap after removing any piece of metal scrap from the mix of scrap material based on the first criteria set. The method may further comprise removing any piece of scrap from the rough-sorted magnesium scrap if the detected parameters associated with each piece of metal scrap does not meet a second criteria set that is different from the first criteria set to provide a final product of fine-sorted magnesium scrap for reuse.

In some embodiments, the method may further comprise using the first set of sensors to detect a shape of each piece of scrap in the mix of scrap material. The method further comprises using the first set of sensors to detect a shape of each piece of scrap in the mix of scrap material such that removing any piece of scrap from the mix of scrap material based on the first criteria set to provide the rough-sorted magnesium scrap includes color, density, and shape. While the rough-sorted magnesium scrap remains wet, the method may further comprise using the second set of sensors to detect the shape of each piece of scrap in the rough-sorted magnesium scrap such that removing any piece of scrap from the rough-sorted magnesium scrap based on the second criteria set to provide the final product of fine-sorted magnesium scrap for reuse includes color, density, and shape.

In some embodiments, the step of removing any piece of scrap from the mix of scrap material based on the first criteria set may comprise determining whether the color of a piece of scrap in the mix of scrap material meets a first predetermined blue color and removing the piece of scrap from the mix of scrap material if the color does not meet the first predetermined blue color. The step of removing any piece of scrap from the mix of scrap material based on the first criteria set may comprise determining whether the density of the piece of scrap in the mix of scrap material meets a first predetermined density and removing the piece of scrap from the mix of scrap material if the density does not meet the first predetermined density. The step of removing any piece of scrap from the mix of scrap material based on the first criteria set may comprise determining whether the shape of the piece of scrap in the mix of scrap material meets a first predetermined shape and removing the piece of scrap from the mix of scrap material if the shape does not meet the first predetermined shape.

In some embodiments, the step of removing any piece of scrap from the rough-sorted magnesium scrap based on the second criteria set may comprise determining whether the color of a piece of scrap in the mix of scrap material meets a second predetermined blue color and removing the piece of scrap from the mix of scrap material if the color does not meet the second predetermined blue color. The step of removing any piece of scrap from the rough-sorted magnesium scrap based on the second criteria set may comprise determining whether the density of the piece of scrap in the mix of scrap material meets a second predetermined density and removing the piece of scrap from the mix of scrap material if the density does not meet the second predetermined density. The step of removing any piece of scrap from the rough-sorted magnesium scrap based on the second criteria set may comprise determining whether the shape of the piece of scrap in the mix of scrap material meets a second predetermined shape and removing the piece of scrap from the mix of scrap material if the shape does not meet the second predetermined shape.

In some embodiments, the second predetermined blue color may be different from the first predetermined blue color. In some embodiments, the second predetermined density may be different from the first predetermined density. In some embodiments, the second predetermined shape may be different from the first predetermined shape. In some embodiments, the second predetermined blue color may be different from the first predetermined blue color, the second predetermined density may be different from the first predetermined density, and the second predetermined shape may be different from the first predetermined shape.

In some embodiments, the second predetermined density may be different from the first predetermined density, the second predetermined blue color may be the same as the first predetermined blue color, and the second predetermined shape may be the same as the first predetermined shape.

In some embodiments, the mix of scrap materials consists essentially of aluminum scrap, magnesium scrap, and other organic materials. The method may further comprise using an eddy current sensor to detect a signal indicative of the aluminum and magnesium scrap in the mix of scrap materials, determining whether the eddy current detects the signal, and removing any scrap as organic material if the eddy current sensor does not detect the signal.

In some embodiments, the first set of sensors and the second set of sensors may each comprise a color camera sensor, a high-energy x-ray sensor, and a laser. The color camera sensor may be configured to detect the color of each piece of scrap. The high-energy x-ray sensor may be configured to detect the density of each piece of scrap. The laser may be configured to detect the shape of each piece of scrap.

According to another aspect of the present disclosure, a method may comprise providing a mix of scrap material consisting essentially of aluminum and magnesium scrap, wetting the mix of scrap material with water to cause the magnesium scrap to turn blue in color, using a first sensor to detect a color of each piece of scrap in the mix of scrap material after wetting the mix of scrap material with water, and removing any piece of scrap from the mix of scrap material if the color detected by the first sensor meets a first predetermined blue color. The method may further comprise using a second sensor to detect the color of each piece of scrap in the mix of scrap material after removing any piece of scrap from the mix of scrap material based on the first predetermined blue color and while the rough-sorted magnesium scrap remains wet and removing any piece of scrap from the mix of scrap material if the color detected by the second sensor meets a second predetermined blue color. In some embodiments, the second predetermined blue color is different from the first predetermined blue color.

According to another aspect of the present disclosure, a method may comprise providing a mix of scrap material consisting essentially of aluminum and magnesium scrap, using a first high energy x-ray sensor to detect a density of each piece of scrap in the mix of scrap material, and removing any piece of scrap from the mix of scrap material if the density of the piece of metal scrap detected by the high energy x-ray sensor does not meet a first predetermined density to provide rough-sorted magnesium scrap. The method may further comprise using a second high energy x-ray sensor to detect the density of each piece of scrap in the rough-sorted magnesium scrap and removing any piece of scrap from the rough-sorted magnesium scrap if the density of the piece of metal scrap detected by the second high energy x-ray sensor does not meet a second predetermined density to provide fine-sorted magnesium scrap, wherein the second predetermined density is different from the first predetermined density.

In some embodiments, the method may further comprise wetting the mix of scrap material with water to cause the magnesium scrap to turn blue in color before removing any piece of scrap from the mix of scrap material, using a first color camera sensor to detect a color of each piece of scrap in the mix of scrap material after wetting the mix of scrap material with water, and removing any piece of scrap from the mix of scrap material if the color detected by the first color camera sensor does not meet a first predetermined blue color. The method may further comprise using a second color camera sensor to detect the color of each piece of scrap in the rough-sorted magnesium scrap after removing any piece of metal scrap from the mix of scrap material based on the first predetermined blue color and while the rough-sorted magnesium scrap remains wet and removing any piece of scrap from the rough-sorted magnesium scrap if the color of the piece of metal scrap detected by the second color camera sensor does not meet a second predetermined blue color. In some embodiments, the second predetermined blue color is different from the first predetermined blue color.

The present disclosure also teaches a system for performing the method or process of sorting mix metal scrap to separate out magnesium scrap from the mixed metal scrap for reuse. The system includes a plurality of sensors, including a first set of sensors and a second set of sensors, each configured to measure or detect different parameters associated with the scrap pieces. The first and second sets of sensors may each comprise a color camera sensor, a high-energy x-ray sensor, and a laser. The system may further include a controller having a memory and a processor for receiving the information from the sensors and preforming the steps of the sorting process.

These and other features of the present disclosure will become more apparent from the following description of the illustrative embodiments.

DETAILED DESCRIPTION OF THE DRAWINGS

Figure 1:
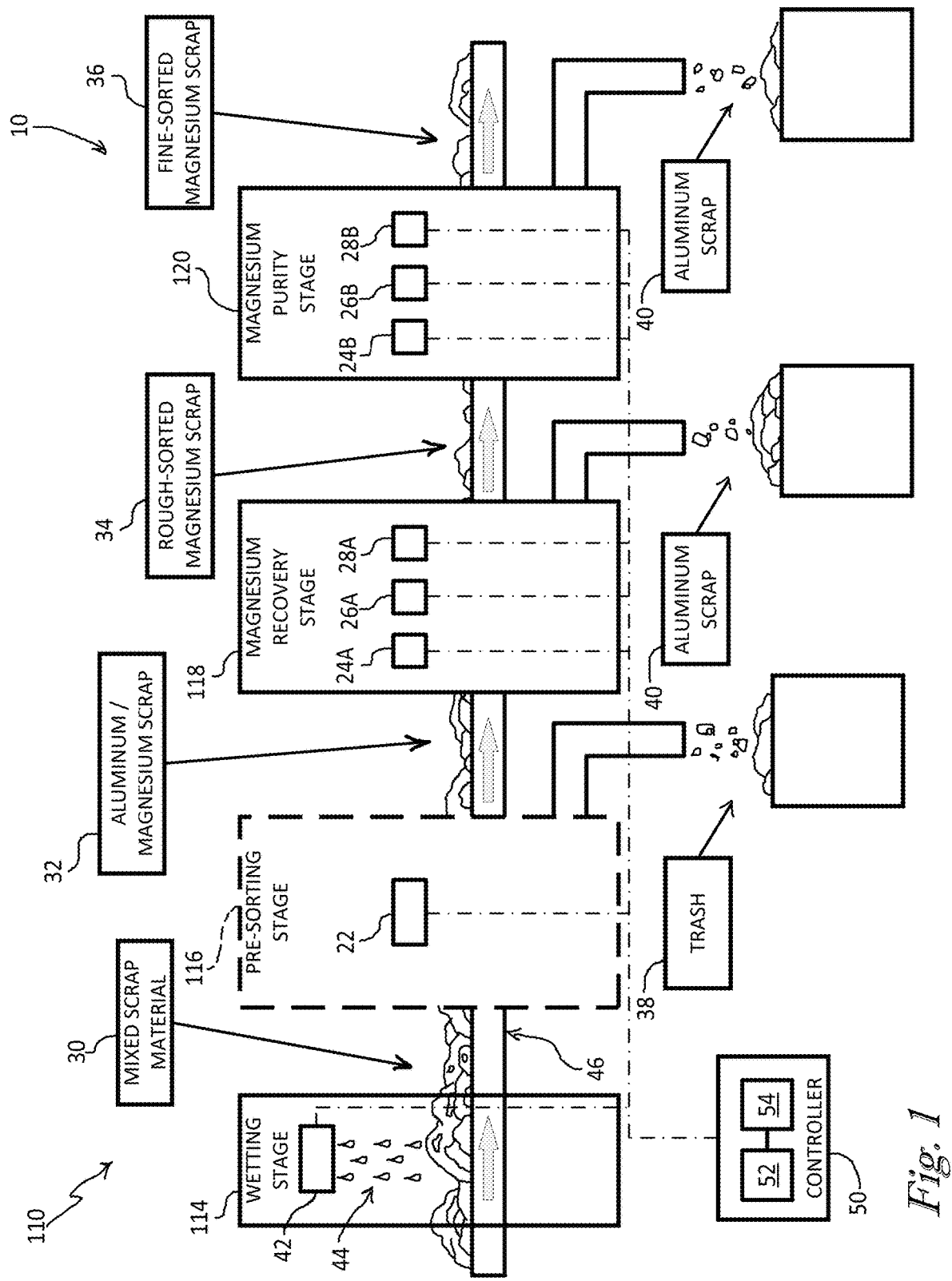
FIG. 1 is diagrammatic view of a sorting system for carrying out a sorting process for sorting out magnesium scrap from a mix of scrap material consisting essentially of aluminum and other material showing the sorting system includes (1) a wetting stage during which the mix of scrap material is sprayed or wetted with water to cause the magnesium scrap in the mix to turn blue in color; (2) a pre-sorting stage during which trash or waste material in the mix of scrap material is removed using eddy-current sensors to detect the aluminum and magnesium scrap in the mix; (3) a magnesium recovery stage during which aluminum scrap in the mix of aluminum and magnesium scrap is removed using a plurality of sensors to sense/detect color, density, and shape of each of the scrap pieces and comparing the information from the sensors to a first criteria set to provide rough-sorted magnesium scrap, and (4) a magnesium purity stage during which any remaining aluminum scrap in the rough-sorted magnesium scrap is removed therefrom using the plurality of sensors to sense/detect color, density, and shape of the scrap pieces and comparing the information from the sensors to a second criteria set to provide a final product of fine-sorted magnesium scrap.

For the purposes of promoting an understanding of the principles of the disclosure, reference will now be made to a number of illustrative embodiments illustrated in the drawings and specific language will be used to describe the same.

A sorting system 20 for carrying out a sorting process 110 for sorting out magnesium scrap from a mix of scrap material to reuse/recycle the magnesium scrap is shown in FIG. 1. Different magnesium manufacturing processes, such as casting, machining, cutting, etc. produce magnesium scrap that may be recycled or re-melted for reuse. However, post-consumer magnesium scrap may be mixed in with other scrap material such that the magnesium scrap needs to be sorted out before it can be reused.

For example, Zorba and Zeppelin are common types of scrap that are sold for reuse. Zorba is a mix of nonferrous metal scrap consisting essentially of aluminum, copper, lead, magnesium, stainless steel, nickel, tin, and zinc, in elemental or alloyed (solid) form. Zeppelin is a mix of light-density nonferrous metal scrap consisting essentially of aluminum scrap, magnesium scrap, and other organic materials such as rubber. The percentage of each metal in the different mixes may vary.

Separating the different metals within each type of scrap may be difficult. In some cases, floatation may be used to separate the light nonferrous metal scrap from the other nonferrous metal scrap. However, separating the aluminum scrap and the magnesium scrap may still pose challenges because of the similarity between the two materials. Handpicking is often used to separate the aluminum scrap from the magnesium scrap, which is time consuming and not cost effective.

Therefore, the sorting process 110 uses color, density, and shape characteristics to separate the other scrap material from the magnesium scrap in the mix of scrap material 30 to produce provide fine-sorted magnesium scrap 36 that is substantially free of any other scrap material such as aluminum. The sorting process 110 uses different sensors to detect the color, density, and shape of the scrap pieces and compares the information from the sensors to the predetermined blue color, density, and shape to sort the magnesium scrap. By sorting the scrap material over the different stages, like as shown in FIG. 1, the sorting parameters may be tailored at each stage to avoid accidently removing the magnesium scrap as aluminum.

The sorting process 110 includes a wetting stage 114, a pre-sorting stage 116, a magnesium recovery stage 118, and a magnesium purity stage 120 as shown in FIGS. 1-5. In the wetting stage 114, the mix of scrap material 30 is sprayed or wetted with water 44. In the pre-sorting stage 116, the organic materials or trash 38 is sorted out from the mix of scrap material 30 to provide a mix of aluminum and magnesium scrap 32. In the magnesium recovery stage 118, aluminum scrap 40 is sorted out of the mix of aluminum and magnesium scrap 32 based on a first criteria set to provide rough-sorted magnesium scrap 34. In the magnesium purity stage 120, the rough-sorted magnesium scrap 34 is further refined by sorting out any remaining aluminum scrap 40 using a second criteria set to provide fine-sorted magnesium scrap 36.

In the wetting stage 114, the mix of scrap material 30 is sprayed or wetted with water 44 to cause the magnesium scrap in the mix 30 to turn blue in color so that the magnesium scrap in the mix 30 can be identified by color in the later stages. The blue color of the wet magnesium scrap allows a color camera sensor 24A, 24B to distinguish the magnesium scrap from the aluminum scrap 40. In the illustrative embodiment, a sprayer 42 is configured to provide the water 44 to wet the magnesium scrap in the mix 32 as shown in FIG. 1

In the pre-sorting stage 116, the trash or waste material 38 in the mix of scrap material 30 is removed therefrom using an eddy-current sensor 22 or eddy current sensors 22 to detect the aluminum and magnesium scrap in the mix 30. The eddy-current sensor 22 generates a magnetic field so that when a conducting material is placed in this field, an eddy current field is generated indicating the piece of scrap is at least one of aluminum and magnesium scrap.

Figure 2:
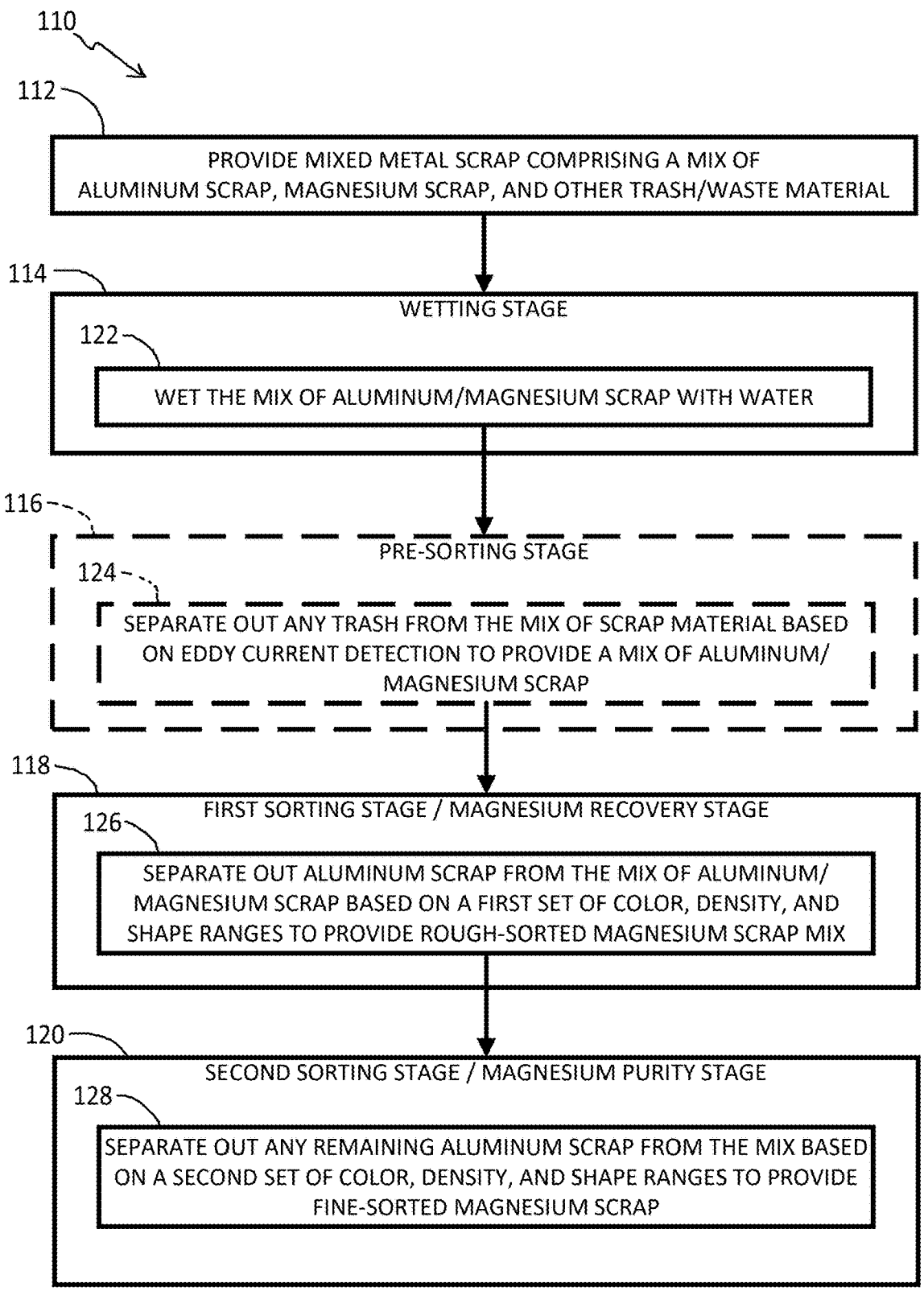
FIG. 2 is a diagrammatic view the sorting process carried out by the system of FIG. 1 showing the sorting process includes the wetting stage, the pre-sorting stage, the magnesium recovery stage, and the magnesium purity stage.
Figure 3:
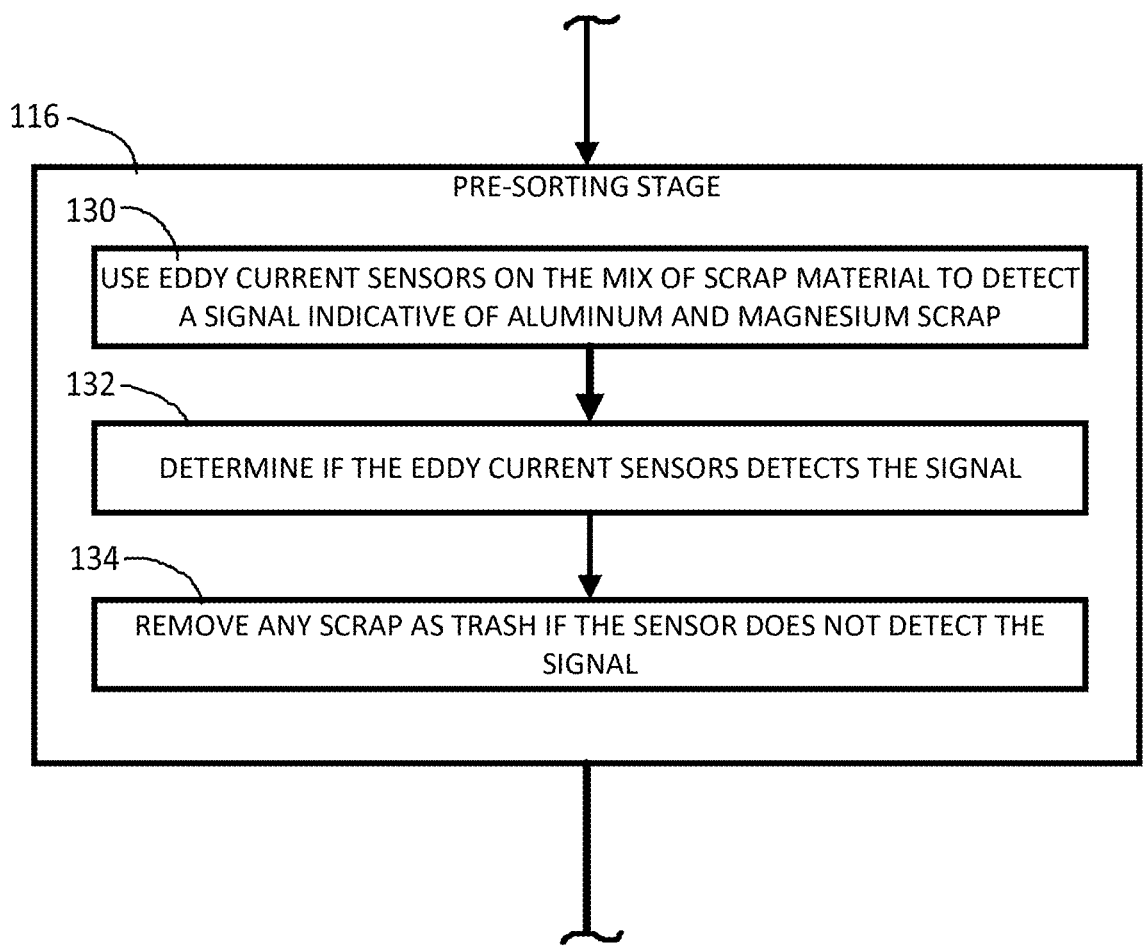
FIG. 3 is a diagrammatic view the pre-sorting stage of the sorting process of FIG. 2 showing the pre-sorting stage includes using eddy current sensors to detect a signal indicative of aluminum and magnesium scrap in the mix of scrap material, determining if the eddy current sensor detects the signal, and removing any scrap as trash if the eddy current sensor does not detect the signal to provide a mix of aluminum and magnesium scrap.
Figure 4:
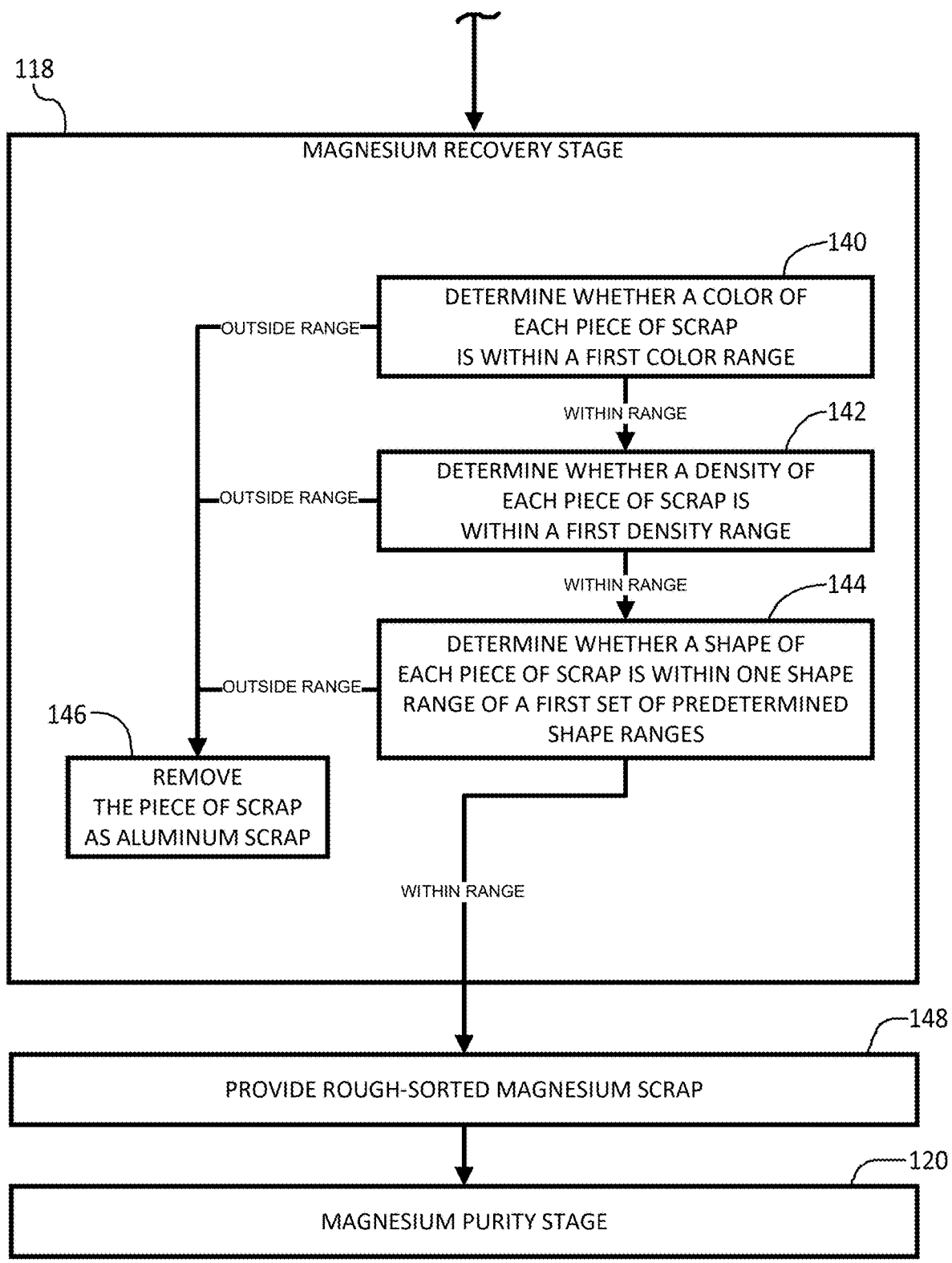
FIG. 4 is a diagrammatic view the magnesium recovery stage of the sorting process of FIG. 2 showing the magnesium recovery stage includes determining whether a color of each piece of scrap meets a first predetermined blue color, determining whether a density of each piece of scrap meets a first predetermined density, and determining whether a shape, i.e. the size, geometry, and/or dimensions, of each piece of scrap meets a first predetermined shape, and removing the pieces of scrap that that does not meet the first predetermined blue color, density, and shape as aluminum scrap to provide the rough-sorted magnesium scrap.

In the magnesium recovery stage 118, the aluminum scrap 40 in the mix of aluminum and magnesium scrap 32 is removed therefrom using a first set of sensors 24A, 26A, 28A to sense/detect color, density, and shape of the scrap pieces and comparing the information from the sensors 24A, 26A, 28A to the first criteria set to provide the rough-sorted magnesium scrap 34 as shown in FIGS. 1, 2, and 4. The blue color characteristics along with the density and shape characteristics allows the magnesium scrap to be distinguished from the aluminum scrap 40.

The first set of sensors 24A, 26A, 28A are used to detect a color, a density, and a shape of each piece of scrap in the mix of scrap material 32. The shape of the scrap includes the size, geometry, and/or dimensions of the scrap 32. If any one of the color, the density, and the shape of a piece of metal scrap detected by the first set of sensors 24A, 26A, 28A does not meet the first criteria set, the piece of scrap is removed from the mix 32 to provide rough-sorted magnesium scrap 34 as shown in FIGS. 1, 2, and 4.

Figure 5:
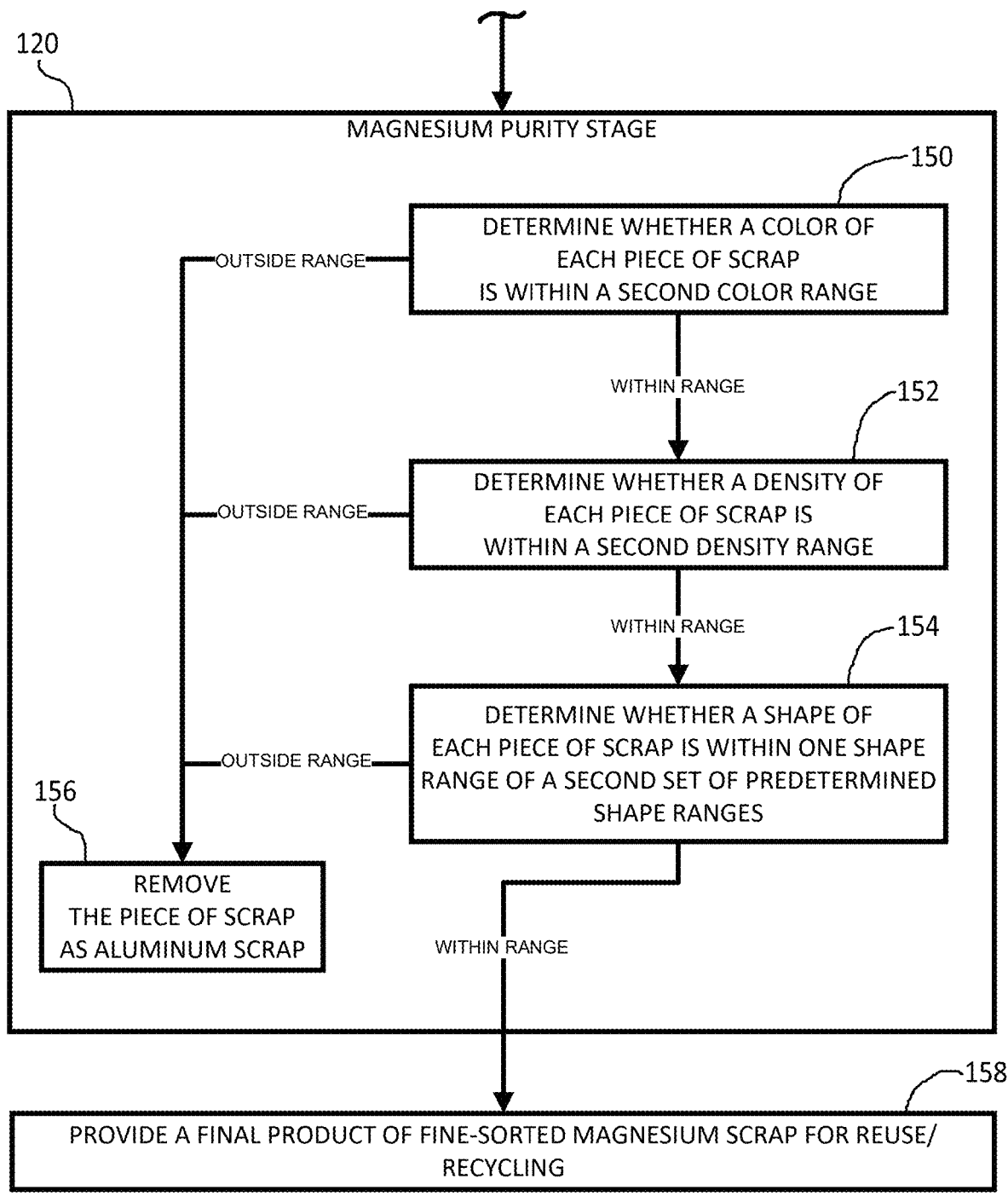
FIG. 5 is a diagrammatic view the magnesium purity stage of the sorting process of FIG. 2 showing the magnesium purity stage includes determining whether a color of each piece of scrap meets a second predetermined blue color, determining whether a density of each piece of scrap meets a second predetermined density, and determining whether a shape, i.e. the size, geometry, and/or dimensions, of each piece of scrap meets a second predetermined shape, and removing the pieces of scrap that does not meet the second predetermined blue color, density, and shape as aluminum scrap to provide the fine-sorted magnesium scrap.

In the magnesium purity stage 120, any remaining aluminum scrap 40 in the rough-sorted magnesium scrap 34 is removed therefrom using a second set of sensors 24B, 26B, 28B to sense/detect color, density, and shape of the scrap pieces and comparing the information from the sensors 24B, 26B, 28B to a second criteria set to provide the final product of fine-sorted magnesium scrap 36 as shown in FIGS. 1, 2, and 5.

The magnesium scrap within the scrap mix 34 remains blue in color from being wetted in the wetting stage 114 such that the scrap 34 is not wetted again before the magnesium purity stage 120. To maintain wetness without more water use, the magnesium purity stage 120 follows the magnesium recovery stage 118 substantially immediately without other steps or delays. To enable immediate transition from the magnesium recovery stage 118 to the magnesium purity stage 120, independent sensor sets, the first set of sensors 24A, 26A, 28A and the second set of sensors 24B, 26B, 28B, are arranged in series.

The second set of sensors 24B, 26B, 28B are used to detect a color, a density, and a shape of each piece of scrap in the rough-sorted magnesium scrap 34. The shape of the scrap includes the size, geometry, and/or dimensions of the scrap 34. If any one of the color, the density, and the shape of a piece of metal scrap detected by the second set of sensors 24B, 26B, 28B does not meet the second criteria set, the piece of scrap is removed from the rough-sorted magnesium scrap 34 to provide the fine-sorted magnesium scrap 36 as shown in FIGS. 1, 2, and 5.

The first and second criteria sets may be different from one stage to the next. In some embodiments, the first and second criteria sets may be based on the type of scrap being sorted, i.e. zorba, zeppelin, etc. The first and second criteria sets may be based on where the scrap is obtained or who provides the scrap material.

The first criteria set includes a first predetermined blue color, a first predetermined density, and first predetermined shapes. In some embodiments, the first criteria set includes a first predetermined blue color range, a first predetermined density range, and a first predetermined shape range.

The first predetermined blue color is the color blue as the magnesium scrap in the mix 30, 32, 34 turns blue in color when wetted with the water 44. Blue light has a wavelength of about 450 nanometers to about 495 nanometers. The first predetermined blue color range may be a wavelength between about 425 nanometers and about 520 nanometers in some embodiments. In some embodiments, the first predetermined blue color range may be a wavelength between about 450 nanometers and about 495 nanometers. In some embodiments, the first predetermined blue color range may be a wavelength between about 460 nanometers and about 485 nanometers. In some embodiments, the first predetermined blue color range may be a wavelength between about 470 nanometers and about 475 nanometers.

The first predetermined density is the density of magnesium, which is about 1.74 g/cm$^3$. The first predetermined density range may between about 1.60 g/cm$^3$ and about 1.80 g/cm$^3$ in some embodiments. In some embodiments, the first predetermined density range may between about 1.65 g/cm$^3$ and about 1.80 g/cm$^3$. In some embodiments, the first predetermined density range may between about 1.70 g/cm$^3$ nanometers and about 1.80 g/cm$^3$. In some embodiments, the first predetermined density range may between about 1.65 g/cm$^3$ and about 1.75 g/cm$^3$.

For comparison, the density of aluminum is about 2.7 g/cm$^3$. In some embodiments, the first predetermined density may be the density of aluminum. In such embodiments, the process would include removing any piece of scrap if the detected density associated with each piece of metal scrap meets the first predetermined density.

In some embodiments, the first predetermined density is anything less than about 2.7 g/cm$^3$. In some embodiments, the first predetermined density is anything less than about 2.5 g/cm$^3$. In some embodiments, the first predetermined density is anything less than about 2.3 g/cm$^3$. In some embodiments, the first predetermined density is anything less than about 2.0 g/cm$^3$.

The first predetermined shapes refers to and includes the size, the geometry, and/or the dimensions. In some embodiments, the first predetermined shapes includes square or rectangular shaped scrap pieces. In some embodiments, the shapes outside of the shape criteria include circular, curved, or tube-like shapes. The tube-like and curved pieces are indicative of what the scrap used to be. For example, steering wheels typically comprise aluminum material and when shredded still maintain a tube-like/curved shape of the steering wheel.

The second criteria set includes a second predetermined blue color, a second predetermined density, and second predetermined shapes. In some embodiments, the second criteria set includes a second predetermined blue color range, a second predetermined density range, and a second predetermined shape range.

As discussed above, the second criteria set may be different from the first criteria set. In some embodiments, one of the second predetermined blue color, the second predetermined density, and the second predetermined shapes may be different from the first predetermined blue color, the first predetermined density, and the first predetermined shapes.

For example, the first predetermined blue color may be the same as the second predetermined blue color, while the first predetermined density and shape are different from the second predetermined density and shape. In some embodiments, the first predetermined blue color and shape may be the same as the second predetermined blue color and shape, while the first predetermined density is different from the second predetermined density. In some embodiments, the second predetermined blue color is different from the first predetermined blue color, the second predetermined density is different from the first predetermined density, and the second predetermined shapes is different from the first predetermined shapes.

The second predetermined blue color is the color blue. The second predetermined blue color range may be a wavelength between about 425 nanometers and about 520 nanometers in some embodiments. In some embodiments, the second predetermined blue color range may be a wavelength between about 450 nanometers and about 495 nanometers. In some embodiments, the second predetermined blue color range may be a wavelength between about 460 nanometers and about 485 nanometers. In some embodiments, the second predetermined blue color range may be a wavelength between about 470 nanometers and about 475 nanometers.

The second predetermined density is the density of magnesium, which is about 1.74 g/cm$^3$. The second predetermined density range may between about 1.60 g/cm$^3$ and about 1.80 g/cm$^3$ in some embodiments. In some embodiments, the second predetermined density range may between about 1.65 g/cm$^3$ and about 1.80 g/cm$^3$. In some embodiments, the second predetermined density range may between about 1.70 g/cm$^3$ and about 1.80 g/cm$^3$. In some embodiments, the second predetermined density range may between about 1.65 g/cm$^3$ and about 1.75 g/cm$^3$.

For comparison, the density of aluminum is about 2.7 g/cm$^3$. In some embodiments, the second predetermined density may be the density of aluminum. In such embodiments, the process would include removing any piece of scrap if the detected density associated with each piece of metal scrap meets the second predetermined density.

In some embodiments, the second predetermined density is anything less than about 2.7 g/cm$^3$. In some embodiments, the second predetermined density is anything less than about 2.5 g/cm$^3$. In some embodiments, the second predetermined density is anything less than about 2.3 g/cm$^3$. In some embodiments, the second predetermined density is anything less than about 2.0 g/cm$^3$.
]
The second predetermined shapes refers to and includes the size, the geometry, and/or the dimensions. In some embodiments, the second predetermined shapes include square or rectangular shaped scrap pieces. In some embodiments, the shapes outside of the shape criteria include circular, curved, or tube-like shapes. The tube-like and curved pieces are indicative of what the scrap used to be. For example, steering wheels typically comprise aluminum material and when shredded still maintain a tube-like/curved shape of the steering wheel.

If any one of the color, density, or shape detected by the sensors 24A, 24B, 26A, 26B, 28A, 28B is out of the respective predetermined blue color, density, and shape, the process 110 includes separating or removing the piece of scrap. For example, if the density and shape measured by the respective sensors meets the respective predetermined density and shape included in the respective criteria set, while the color is outside the respective predetermined blue color included in the respective criteria set, the piece of scrap is sorted or removed from the mix.

In some embodiments, only color and density may be measured and used to sort the scrap material. If one of the color and density detected by the sensors 24A, 24B, 26A, 26B is outside the respective predetermined blue color and density included in the respective criteria set, the process 110 includes separating or removing the piece of scrap.

Using the process 110, about 1 ton to 3 tons of scrap material may be sorted per hour depending on the speed of the conveyor 46. If typical handpicking techniques were used to sort the scrap material, it would take about five times as long to sort the same amount of scrap material. Moreover, handing picking the material may not provide the same level of fine-sorted magnesium scrap 36.

Turning again to the process 110, the process begins with providing the mix of scrap material 30 as suggested by box 112 in FIG. 2. Next, the process 110 moves to the wetting stage 114. During the wetting stage 114, the process 110 includes spraying or wetting the mix of scrap material 30 with water 44 using the sprayer 42 as suggested by box 122 in FIG. 2.

Next, the process 110 moves to the pre-sorting stage 116. During the pre-sorting stage 116, the process 110 includes separating or sorting out any trash/waste 38 from the mix of scrap material 30 based on eddy current detected to provide the mix of aluminum and magnesium scrap 32 as suggested by box 124 in FIG. 2.

In some embodiments, the process 110 skips the pre-sorting stage 116 and moves to the magnesium recovery stage 118 after the wetting stage 114 as suggested in FIGS. 1 and 2. During the magnesium recovery stage 118, the process 110 includes separating or sorting the aluminum scrap 40 is out of the mix of aluminum and magnesium scrap 32 based on the first criteria set including the first predetermined blue color, the first predetermined density, and the first predetermined shapes to provide rough-sorted magnesium scrap 34 as suggested by box 126 in FIG. 2.

The process 110 then moves to the magnesium purity stage 120 to further sort out any remaining aluminum scrap 40. In the magnesium purity stage 120, the process 110 includes separating or sorting any remaining aluminum scrap 40 out of the scrap 34 based on the second criteria set including the second predetermined blue color, the second predetermined density, and the second predetermined shapes to provide fine-sorted magnesium scrap 36 as suggested by box 128 in FIG. 2.

In the wetting stage 114, the process 110 includes wetting the mix of aluminum and magnesium scrap 32 with water 44 to turn the magnesium scrap blue in color suggested by box 122. A sprayer 42 is configured to spray water 44 on the mix 30 to wet the material which turns the magnesium scrap in the mix 30 blue in color.

In the pre-sorting stage 116, the trash or waste material 38 in the mix of scrap material 30 is removed therefrom using eddy-current sensors 22 to detect the aluminum and magnesium scrap in the mix 30 as suggested by box 124 in FIG. 2. The eddy-current sensor(s) 22 is configured to detect a signal indicative of the aluminum and magnesium scrap in the mix 30. The process 110 includes using the eddy current sensor 22 to detect the signal indicative of the aluminum and magnesium scrap in the mix 30 as suggested by box 130, determining if the eddy current sensor 22 detects the signal as suggested by box 132, and removing any scrap as trash 38 if the sensor 22 do not detect the signal. The signal is the generation of an eddy current in the illustrative embodiment. In other embodiments, another suitable sensor may be used.

In the magnesium recovery stage 118, the process 110 includes separating out the aluminum scrap 40 from the mix of aluminum and magnesium scrap 32 based on the first predetermined blue color, density, and shape as suggested by box 124 in FIGS. 1 and 4. The first set of sensors 24A, 26A, 28A are used to sense/detect color, density, and shape of the scrap pieces and the information from the sensors 24A, 26A, 28A is compared to the first criteria set to remove aluminum scrap 40 from the mix 32.

In some embodiments, the process 110 includes wetting the mix of aluminum and magnesium scrap 32 with water 44 to turn the magnesium scrap blue in color and separating out the aluminum scrap 40 from the mix of aluminum and magnesium scrap 32 based only on the first predetermined blue color and density. The first set of sensors 24A, 26A are used to sense/detect color and density of the scrap pieces and the information from the sensors 24A, 26A is compared to the first criteria set to remove aluminum scrap 40 from the mix 32.

The first set of sensors 24A, 26A, 28A include a color camera sensor 24A, a high-energy x-ray sensor 26A, and a laser 28A as shown in FIG. 1. The color camera sensor 24A is configured to detect the color of each piece of scrap. The high-energy x-ray sensor 26A is configured to detect the density of each piece of scrap. The laser 28A is configured to detect the shape of each piece of scrap. In some embodiments, the first set of sensors 24A, 26A only includes the color camera sensor 24A and the high-energy x-ray sensor 26A.

The process 110 includes determining whether the color of a piece of scrap in the mix of scrap material 32 meets a first predetermined blue color as suggested by box 140 in FIG. 4. If the color does not meet the first predetermined blue color, the piece of scrap is removed or separated from the mix of scrap material 32 as aluminum scrap 40 as suggested by box 146 in FIG. 4.

Additionally, the process 110 includes determining whether the density of the piece of scrap in the mix of scrap material 32 meets a first predetermined density as suggested by box 142 in FIG. 4. If the density does not meet the first density criteria, the piece of scrap is removed or separated from the mix of scrap material 32 as aluminum scrap 40 as suggested by box 146 in FIG. 4.

In the illustrative embodiment, the process 110 further includes determining whether the shape of the piece of scrap in the mix of scrap material 32 meets one of the first predetermined shapes as suggested by box 144 in FIG. 4. If the shape does not meet one of the first predetermined shapes, the piece of scrap is removed or separated from the mix of scrap material 32 as aluminum scrap 40 as suggested by box 146 in FIG. 4. In some embodiments, the shape of the scrap pieces is not used to help sort the scrap material.

The first predetermined shapes include square or rectangular shaped scrap pieces. The shapes outside of the predetermined shapes includes circular, curved, or tube-like shapes. The tube-like and curved pieces are indicative of what the scrap used to be. For example, steering wheels typically comprise aluminum material and when shredded still maintain a tube-like/curved shape of the steering wheel.

In the magnesium purity stage 120, the process 110 includes separating out any remaining aluminum scrap 40 in the rough-sorted magnesium scrap 34 based on the second predetermined blue color, density, and shape as suggested by box 126 in FIGS. 1 and 5. The second set of sensors 24B, 26B, 28B are used to sense/detect color, density, and shape of the scrap pieces and the information from the sensors 24B, 26B, 28B is compared to the second criteria set to remove any remaining aluminum scrap 40 from the scrap 34.

In some embodiments, the process 110 includes separating out any remaining aluminum scrap 40 in the rough-sorted magnesium scrap 34 based only on the second predetermined blue color and density. The second set of sensors 24B, 26B, 28B are used to sense/detect color and density of the scrap pieces and the information from the sensors 24B, 26B is compared to the second criteria set to remove any remaining aluminum scrap 40 from the scrap 34.

The second set of sensors 24B, 26B, 28B include a color camera sensor 24B, a high-energy x-ray sensor 26B, and a laser 28B as shown in FIG. 1. The color camera sensor 24B is configured to detect the color of each piece of scrap. The high-energy x-ray sensor 26B is configured to detect the density of each piece of scrap. The laser 28B is configured to detect the shape of each piece of scrap. In some embodiments, the second set of sensors 24B, 26B only includes the color camera sensor 24B and the high-energy x-ray sensor 26B.

In the magnesium purity stage 120, the scrap 34 remains wet from the magnesium recover stage 118 and is not wetted again. The process 110 includes determining whether the color of a piece of scrap in the scrap 34 meets a second blue color criteria as suggested by box 150 in FIG. 5. If the color does not meet the second blue color criteria, the piece of scrap is removed or separated from the scrap 34 as aluminum scrap 40 as suggested by box 156 in FIG. 5.

Additionally, the process 110 includes determining whether the density of the piece of scrap in the scrap 34 meets a second density criteria as suggested by box 152 in FIG. 5. If the density does not meet the second density criteria, the piece of scrap is removed or separated from the scrap 34 as aluminum scrap 40 as suggested by box 156 in FIG. 5.

In the illustrative embodiment, the process 110 further includes determining whether the shape of the piece of scrap in the scrap 34 meets one of the second predetermined shapes as suggested by box 154 in FIG. 5. If the shape does not meet one of the second predetermined shapes, the piece of scrap is removed or separated from the scrap 34 as aluminum scrap 40 as suggested by box 156 in FIG. 5. In some embodiments, the shape of the scrap pieces is not used to help sort the scrap material.

The second predetermined shapes include square or rectangular shaped scrap pieces. The shapes outside of the predetermined shapes include circular, curved, or tube-like shapes. The tube-like and curved pieces are indicative of what the scrap used to be. For example, steering wheels typically comprise aluminum material and when shredded still maintain a tube-like/curved shape of the steering wheel.

It is contemplated that the first set of sensors 24A, 26A, 28A could be used a second time to perform the magnesium purity stage 120. It is also contemplated that the material may be wetted a second time before the magnesium purity stage 120.

The sorting system 20 includes the different stages 114, 116, 118, 120 as shown in FIG. 1. Each stage of the system 20 comprising the respective sensors 24A, 24B, 26A, 26B, 28A, 28B as shown in FIG. 1. The sorting system 20 further includes a conveyor 46 configured to transport the scrap between the different stages 114, 116, 118, 120 of the system 20. The system 20 further includes the sprayer 42 configured to wet the scrap material. In some embodiments, the system 20 may include additional sprayers 42 between the stages 114, 116, 118, 120 if the material is wetted more than once.

The sorting system 20 further includes a controller 50 having a memory 52 and a processor 54 as shown in FIG. 1 for receiving the information from the sensors 22, 24A, 24B, 26A, 26B, 28A, 28B and preforming the steps of the sorting process 110. The controller 50 is coupled to the sensors 22, 24A, 24B, 26A, 26B, 28A, 28B to receiving the information detected by the sensors 22, 24A, 24B, 26A, 26B, 28A, 28B. The controller 50 is also coupled to the sprayer 42 to control activation of the sprayer 42.

The memory 52 includes instructions corresponding to the different steps of the process 110. The memory 52 is also configured to store the different criteria sets and the predetermined colors, densitys, and shapes in the first and second criteria sets. The processor 54 is coupled to the memory 52 and configured to execute the instructions help in the memory 52.

For the purposes of the present disclosure, the modifier "about" means±5% of a given valve. Of course, greater or lesser deviation is contemplated and may be used in processed methods within the spirit of this disclosure.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A method of sorting mix material scrap to separate out magnesium scrap from the mixed material scrap for reuse, the method comprising:
   providing a mix of scrap material consisting essentially of aluminum and magnesium scrap,
   wetting the mix of scrap material with water to cause the magnesium scrap to turn blue in color,
   using a first set of sensors to detect a color and a density of each piece of scrap in the mix of scrap material after wetting the mix of scrap material with water,
   removing any piece of scrap from the mix of scrap material if the detected parameters associated with each piece of metal scrap does not meet a first criteria set to provide rough-sorted magnesium scrap,
   while the rough-sorted magnesium scrap remains wet, using a second set of sensors to detect the color and the density of each piece of scrap in the rough-sorted magnesium scrap after removing any piece of metal scrap from the mix of scrap material based on the first criteria set, and
   removing any piece of scrap from the rough-sorted magnesium scrap if the detected parameters associated with each piece of metal scrap does not meet a second criteria set that is different from the first criteria set to provide a final product of fine-sorted magnesium scrap for reuse.

2. The method of claim 1, further comprising:
   using the first set of sensors to detect a shape of each piece of scrap in the mix of scrap material such that removing any piece of scrap from the mix of scrap material based on the first criteria set to provide the rough-sorted magnesium scrap includes color, density, and shape, and
   while the rough-sorted magnesium scrap remains wet, using the second set of sensors to detect the shape of each piece of scrap in the rough-sorted magnesium scrap such that removing any piece of scrap from the rough-sorted magnesium scrap based on the second criteria set to provide the final product of fine-sorted magnesium scrap for reuse includes color, density, and shape.

3. The method of claim 2, wherein removing any piece of scrap from the mix of scrap material based on the first criteria set comprises:
determining whether the color of a piece of scrap in the mix of scrap material meets a first predetermined blue color and removing the piece of scrap from the mix of scrap material if the color does not meet the first predetermined blue color,
determining whether the density of the piece of scrap in the mix of scrap material meets a first predetermined density and removing the piece of scrap from the mix of scrap material if the density does not meet the first predetermined density, and
determining whether the shape of the piece of scrap in the mix of scrap material meets a first predetermined shape and removing the piece of scrap from the mix of scrap material if the shape does not meet the first predetermined shape.

4. The method of claim 3, wherein removing any piece of scrap from the rough-sorted magnesium scrap based on the second criteria set comprises:
determining whether the color of a piece of scrap in the mix of scrap material meets a second predetermined blue color and removing the piece of scrap from the mix of scrap material if the color does not meet the second predetermined blue color,
determining whether the density of the piece of scrap in the mix of scrap material meets a second predetermined density and removing the piece of scrap from the mix of scrap material if the density does not meet the second predetermined density, and
determining whether the shape of the piece of scrap in the mix of scrap material meets a second predetermined shape and removing the piece of scrap from the mix of scrap material if the shape does not meet the second predetermined shape.

5. The method of claim 4, wherein the second predetermined blue color is different from the first predetermined blue color.

6. The method of claim 4, wherein the second predetermined density is different from the first predetermined density.

7. The method of claim 4, wherein the second predetermined shape is different from the first predetermined shape.

8. The method of claim 4, wherein the second predetermined blue color is different from the first predetermined blue color, wherein the second predetermined density is different from the first predetermined density, and wherein the second predetermined shape is different from the first predetermined shape.

9. The method of claim 4, wherein the second predetermined density is different from the first predetermined density, wherein the second predetermined blue color is the same as the first predetermined blue color, and wherein the second predetermined shape is the same as the first predetermined shape.

10. The method of claim 1, wherein removing any piece of scrap from the mix of scrap material based on the first criteria set comprises:
determining whether the color of a piece of scrap in the mix of scrap material meets a first predetermined blue color and removing the piece of scrap from the mix of scrap material if the color does not meet the first predetermined blue color, and
determining whether the density of the piece of scrap in the mix of scrap material meets a first predetermined density and removing the piece of scrap from the mix of scrap material if the density does not meet the first predetermined density.

11. The method of claim 1, wherein removing any piece of scrap from the rough-sorted magnesium scrap based on the second criteria set comprises:
determining whether the color of a piece of scrap in the mix of scrap material meets a second predetermined blue color and removing the piece of scrap from the mix of scrap material if the color does not meet the second predetermined blue color, and
determining whether the density of the piece of scrap in the mix of scrap material meets a second predetermined density and removing the piece of scrap from the mix of scrap material if the density does not meet the second predetermined density.

12. The method of claim 1, wherein the first set of sensors and the second set of sensors each comprises a color camera sensor configured to detect the color of each piece of scrap, a x-ray sensor configured to detect the density of each piece of scrap, a laser configured to detect the shape of each piece of scrap.

13. A method comprising:
providing a mix of scrap material consisting essentially of aluminum and magnesium scrap,
wetting the mix of scrap material with water to cause the magnesium scrap to turn blue in color,
using a first sensor to detect a color of each piece of scrap in the mix of scrap material after wetting the mix of scrap material with water, and
removing any piece of scrap from the mix of scrap material if the color detected by the first sensor meets a first predetermined blue color.

14. The method of claim 13, further comprising
while the mix of scrap material remains wet, using a second sensor to detect the color of each piece of scrap in the mix of scrap material after removing any piece of scrap from the mix of scrap material based on the first predetermined blue color, and
removing any piece of scrap from the mix of scrap material if the color detected by the second sensor meets a second predetermined blue color.

15. The method of claim 14, wherein the second predetermined blue color is different from the first predetermined blue color.

16. A method comprising:
providing a mix of scrap material consisting essentially of aluminum and magnesium scrap,
wetting the mix of scrap material with water to cause the magnesium scrap to turn blue in color before removing any piece of scrap from the mix of scrap material,
using a first color camera sensor to detect a color of each piece of scrap in the mix of scrap material after wetting the mix of scrap material with water, and
removing any piece of scrap from the mix of scrap material if the color detected by the first color camera sensor does not meet a first predetermined blue color,
using a first x-ray sensor to detect a density of each piece of scrap in the mix of scrap material, and
removing any piece of scrap from the mix of scrap material if the density of the piece of metal scrap detected by the first x-ray sensor does not meet a first predetermined density to provide rough-sorted magnesium scrap.

17. The method of claim 16, further comprising:

using a second x-ray sensor to detect the density of each piece of scrap in the rough-sorted magnesium scrap, and removing any piece of scrap from the rough-sorted magnesium scrap if the density of the piece of metal scrap detected by the second x-ray sensor does not meet a second predetermined density to provide fine-sorted magnesium scrap, wherein the second predetermined density is different from the first predetermined density.

18. The method of claim 16, further comprising:

using a second color camera sensor to detect the color of each piece of scrap in the rough-sorted magnesium scrap after removing any piece of metal scrap from the mix of scrap material based on the first predetermined blue color while the rough-sorted magnesium scrap remains wet, and removing any piece of scrap from the rough-sorted magnesium scrap if the color of the piece of metal scrap detected by the second color camera sensor does not meet a second predetermined blue color.

19. The method of claim 18, wherein the second predetermined blue color is different from the first predetermined blue color.

\* \* \* \* \*